United States Patent [19]

Hara

[11] Patent Number: 5,114,114
[45] Date of Patent: May 19, 1992

[54] MOLDING CONTAINER FOR MANUFACTURING GLASS ARTICLE

[75] Inventor: Koichi Hara, Ome, Japan

[73] Assignee: Hoya Corporation, Tokyo, Japan

[21] Appl. No.: 491,072

[22] Filed: Mar. 6, 1990

[51] Int. Cl.$^5$ .................... B28B 7/20; B29C 33/00
[52] U.S. Cl. ........................ 249/60; 65/901; 249/117; 425/808
[58] Field of Search ............ 65/18.1, 901; 249/16, 249/52, 60, 61, 99, 112, 117, 140; 264/1.3, 1.9; 425/808, 810

[56] References Cited

U.S. PATENT DOCUMENTS

| | | | |
|---|---|---|---|
| D. 26,008 | 9/1896 | Sanders | 249/52 |
| 661,273 | 11/1900 | Park | 249/52 |
| 1,518,581 | 12/1924 | Hellyer | 249/140 |
| 3,220,856 | 11/1965 | Vischer, Jr. | 249/117 |
| 3,429,362 | 2/1969 | Tachimoto et al. | 249/52 |
| 3,883,109 | 5/1975 | Hahne | 249/140 |
| 4,408,833 | 10/1983 | Gowan | 264/1.9 |
| 4,415,138 | 11/1983 | Jarsen | 425/810 |
| 4,702,048 | 10/1987 | Millman | 249/2 |
| 4,921,205 | 5/1990 | Drew, Jr. et al. | 425/808 |

Primary Examiner—Jay H. Woo
Assistant Examiner—Khanh P. Nguyen
Attorney, Agent, or Firm—Nixon & Vanderhye

[57] ABSTRACT

In a method of manufacturing a glass article by means of a sol-gel process, a metal alkoxide is hydrolyzed, dehydrated and condensed to obtain a wet gel. A molding container is used for drying and shrinking the wet gel to obtain a dry gel. A bottom wall of the molding container has an inner surface formed with a recess or recesses. The wet gel is dried and shrunk to form a gap or gaps between the inner surface of the bottom wall and the gel on the way of drying and shrinking. The gap or gaps communicate with a space which occurs between an inner surface of a peripheral wall of the molding container and the gel on the way of drying and shrinking. A liquid layer, which is generated by the drying and shrinking of the wet gel, between the inner surface of the bottom wall and the gel on the way of drying and shrinking, accompanied with the drying and shrinking of the wet gel, is vaporized and removed to the ambient atmosphere through the gap or gaps and the space, according to which the gel on the way of drying and shrinking is dried.

4 Claims, 6 Drawing Sheets

MOLDING CONTAINER FOR MANUFACTURING GLASS ARTICLE

BACKGROUND OF THE INVENTION

The present invention relates to methods of manufacturing glass articles and molding containers for use in the methods and, more particularly, to a method of manufacturing a glass article by means of a sol-gel process using a metal alkoxide, and a molding container for use in the method.

As a method of manufacturing a glass article, a melting process is known in which a glass row material containing $SiO_2$ as a major component and other metal oxides such as $Al_2O_3$, $TiO_2$, PbO and so on as optional components is melted to obtain the glass article. Further, a sol-gel process is also known in which a metal alkoxide expressed by a general formula $M(OR)_n$ is used to obtain a glass article. In the general formula, M represents metals such as Si, Al, Ti, Pb and the like, R represents an alkyl radical, and n represents integers corresponding respectively to valences of the respective metals.

The sol-gel process using the metal alkoxide is as follows. That is, the metal alkoxide is added into and mixed with an organic solvent such as ethanol or the like. Subsequently, water and hydrolysis catalyst are added to the mixture to obtain a homogeneous sol solution. Then, the sol solution is hydrolyzed, dehydrated and condensed to obtain a wet gel. The wet gel is dried and shrunk within a molding container to form a dry gel. Subsequently, the dry gel is heated and sintered into a non-porous glass. Thus, the desired glass article is obtained.

The sol-gel process has such advantages that the glass article having high purity can be obtained, the glass article can be obtained at considerably lower temperature than the conventional melting process, and so on. Accordingly, in recent years, the spotlight of attention is focused particularly on the sol-gel process. The sol-gel process has already been put into practice in manufacturing of a fibrous glass article, manufacturing of a coating film, and the like.

By the way, as represented by a photomask substrate, there are many demands for a glass article in the form of a planar plate. It has been desired to establish a manufacturing method of the glass article in the form of a planar plate, particularly, a large size glass article in the form of a planar plate by the sol-gel process using the metal alkoxide.

In the case where the large size glass article in the form of a planar plate is attempted to be manufactured by means of the sol-gel process which has conventionally been tried, however, there is such a problem that cracks tend to occur when the wet gel is fried and shrunk within the molding container to obtain the dry gel. Thus, it has extremely been difficult to efficiently obtain the large size glass article in the form of a planar plate. For this reason, in order to efficiently obtain the large size glass article in the form of a planar plate by means of the sol-gel process using the metal alkoxide, there is such a problem that the cracks must be restrained which occur when the wet gel is dried and shrunk within the molding container to form the dry gel.

SUMMARY OF THE INVENTION

It is therefore an object of the invention to provide a method of manufacturing a glass article, said method being capable of restraining cracks which occur when a wet gel is dried and shrunk within a molding container to form a dry gel, thereby efficiently obtaining the glass article which is large in size and which is in form of a planar plate.

It is another object of the invention to provide a molding container for use in the above-described method.

The inventor of this application has earnestly made researches to find out a principal cause that it is extremely difficult to obtain a large size glass article in the form of a planar plate by means of the conventional sol-gel process. The researches indicate that, in the case where, as is in the conventional process, a wet gel is dried and shrunk within a molding container whose bottom wall has a planar inner surface, a liquid layer is generated between the inner surface of the bottom wall and the gel on the way of drying and shrinking, accompanied with drying and shrinking of the wet gel. As the result, the dried stage between a surface layer and a bottom layer of the gel is made non-uniform on the way of drying and shrinking, so that cracks occur in the gel on the way of drying and shrinking. Further, the researches also indicate that, in the case where the molding container used when the wet gel is dried and shrunk has a lid or closure member whose opening rate is made small extremely to dry and shrink the wet gel slowly, the liquid layer can be vaporized and removed without occurrence of cracks in the gel on the way of drying and shrinking. In this case, however, non-uniformity in dried state is not dissolved between the surface layer and the bottom layer of the gel at the time the gel on the way of drying and shrinking reaches the dry gel. Thus, cracks occur at the last or terminal stage of the drying and shrinking.

On the basis of the above knowledge, the inventor of this application has investigated means for restraining cracks in the wet gel at drying and shrinking thereof. The consideration arrives at this invention.

According to the invention, there is provided a method of manufacturing a glass article by means of a sol-gel process, the method comprising the steps of:

mixing a metal alkoxide, water and an organic solvent with each other to obtain a sol solution, and hydrolyzing, dehydrating and condensing the metal alkoxide to obtain a wet gel;

drying and shrinking the wet gel to obtain a dry gel; and heating and sintering the dry gel into a non-porous glass to obtain the glass article, wherein a molding container is used for drying and shrinking the wet gel to obtain the dry gel, the molding container having a bottom wall and a peripheral wall, the bottom wall having an inner surface formed with recess means, wherein the wet gel is dried and shrunk to form gap means between the inner surface of the bottom wall of the molding container and the gel on the way of drying and shrinking, the gap means communicating with a space which occurs between an inner surface of the peripheral wall and the gel on the way of drying and shrinking, and wherein a liquid layer, which is generated by the drying and shrinking of the wet gel, between the inner surface of the bottom wall and the gel on the way of drying and shrinking, accompanied with the drying and shrinking of the wet gel, is vaporized and removed to the ambient atmosphere through the gap means and the space, whereby the bottom layer of the gel on the way of drying and shrinking is dried.

According to the invention, there is also provided a molding container for use in drying and shrinking a wet gel to obtain a dry gel in manufacturing a glass article by means of a sol-gel process, the molding container having a bottom wall whose inner surface is formed with recess means.

As described above, the method of manufacturing the glass article according to the invention includes the three, or first, second and third steps. The first step is to mix a metal alkoxide, water and an organic solvent as essential component, and a hydrolysis catalyst such as acid, alkali or the like as an optional component to obtain the sol solution, and to hydrolyze, dehydrate and condense the metal alkoxide to obtain the wet gel.

The metal alkoxide, the organic solvent, the hydrolysis catalyst such as acid, alkali or the like, and so on are not limited to specific ones, and the metal alkoxide, the organic solvent, the hydrolysis catalyst and the like which are used conventionally can be utilized. Further, a preparation of the sol solution as well as hydrolysis, dehydration and condensation of the metal alkoxide are also conducted in accordance with the conventional method.

The second step in the method according to the invention is to dry and contract the wet gel obtained by the above first step, thereby obtaining the dry gel. Conventionally, the second step has been put into practice using a molding container whose bottom wall has a planer inner surface. In the invention, however, the molding container is used whose bottom wall has the recess means.

In connection with the above, in the method according to the invention, the molding container having the bottom wall whose inner surface is provided with the recess means should be used when the dry gel is obtained from the wet gel. Accordingly, the first step of obtaining the wet gel from the sol solution may be conducted with the molding container having the bottom wall whose inner surface is formed with the recess means, and subsequently, the second step of obtaining the dry gel from the wet gel may be carried out with the same molding container. Alternatively, after the first step has been conducted by the use of a molding container whose bottom wall has a planar inner surface, the thus obtained wet gel may be transferred to the molding container having the bottom wall whose inner surface is provided with the recess means to carry out the second step.

The molding container having the bottom wall whose inner surface is formed with the recess means can be obtained by provision of one or more straight grooves or projections, or a plurality of projecting points or depressed or concave points in or on the inner surface of the bottom wall to form the recess means. Further, the molding container may be obtained such that a plate or a sheet whose upper surface has the similar grooves or projections, or similar projecting points or concave points rests on the inner surface of the bottom wall, or another elements or members such as a plurality of pipes, rods or the like are spread over the inner surface of the bottom wall to form a plurality of recesses. In the invention, the configuration of the molding container is not particularly limited to a specific one, and may be in any forms such as rectangle, circle, trapezoid and so on.

In connection with the above, the grooves referred to above are formed by a plurality of recesses which are provided in the inner surface of the bottom wall and which extend straight or linearly. The projections are ones which are provided on the inner surface of the bottom wall and which extend straight. Further, the projecting points are ones which are provided on the inner surface of the bottom wall in a studded manner. The concave points are ones which are provided in the inner surface of the bottom wall in a studded manner.

As described previously, in the method according to the invention, the inner surface of the bottom wall of the molding container, which is used to dry and shrink the wet gel to obtain the dry gel, has the recess means. The function of the recesses is to allow the gel contained therein to rise up (contract) to the tops of the protuberances on the inner surface of the bottom wall of the molding container, forming the gaps between the bottom wall of the molding container and the wet gel during drying and shrinking thereof. Thereby allowing the liquid portion of the wet gel to be drawn off to an ambient atmosphere and precipitating the drying of the gel. Moreover, the liquid layer generated between the inner surface of the bottom wall of the molding container and the gel on the way of drying and shrinking, accompanied with drying and shrinking of the wet gel, is vaporized and removed to the ambient atmosphere through the gap means formed between the inner surface of the bottom wall of the molding container and the gel on the way of drying and shrinking and through the space occurring between the inner surface of the peripheral wall of the molding container and the gel on the way of drying and shrinking. Furthermore, even after the liquid layer generated between the upper surface of the bottom wall of the molding container and the gel on the way of drying and shrinking, the bottom layer of the gel on the way of drying and shrinking is dried by evaporating the liquid layer through the gap means and the space.

Thus, a difference in dried state between the surface layer and the bottom layer of the gel on the way of drying and shrinking is reduced, and a difference in dried state between a central portion and a peripheral portion of the gel on the way of drying and shrinking is also reduced. Accordingly, it is possible to restrain cracks of the gel on the way of drying and shrinking, which have conventionally been resulted from such difference.

As mentioned above, according to the invention, cracks can be restrained which have conventionally occurred when the wet gel is dried and shrunk within the molding container to form the dry gel.

Accordingly, enforcement or execution of the present invention enables the glass article of large size in the form of a planar plate to be efficiently manufactured on the basis of the sol-gel process which uses the metal alkoxide.

DETAILED DESCRIPTION

Various embodiments of a molding container having a bottom wall whose inner surface is formed with a recess or recesses will be described below, in two cases. That is, one of the two cases is such that a first step of obtaining a wet gel from a sol solution and a second step of obtaining a dry gel from the wet gel are conducted by the use of the same molding container having a bottom wall whose inner surface is formed with a recess or recesses. The other case is such that the wet gel is obtained at the first step within a first container, and the wet gel is transferred to a second separate molding container having a bottom wall whose inner surface is formed with a recess or recesses, to conduct the second step.

(1) The case will first be described where the first step of obtaining the wet gel from the sol solution and the second step of obtaining the dry gel from the wet gel are conducted by the use of the same molding container having the bottom wall whose inner surface is formed with the recess or recesses.

In the above case, the sol solution changes as schematically shown in FIGS. 1(a) through 1(e) to form the dry gel.

Figure 1A:
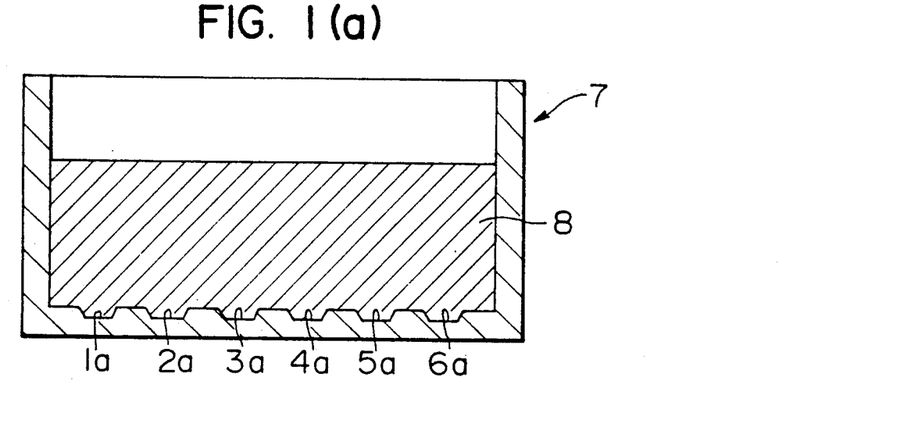
FIGS. 1(a) through 1(e) are schematic cross-sectional views showing a change from a sol solution to a dry gel in the case where a first step of obtaining a wet gel from the sol solution and a second step of obtaining the dry gel from the wet gel are conducted within the same molding container.
Figure 1B:
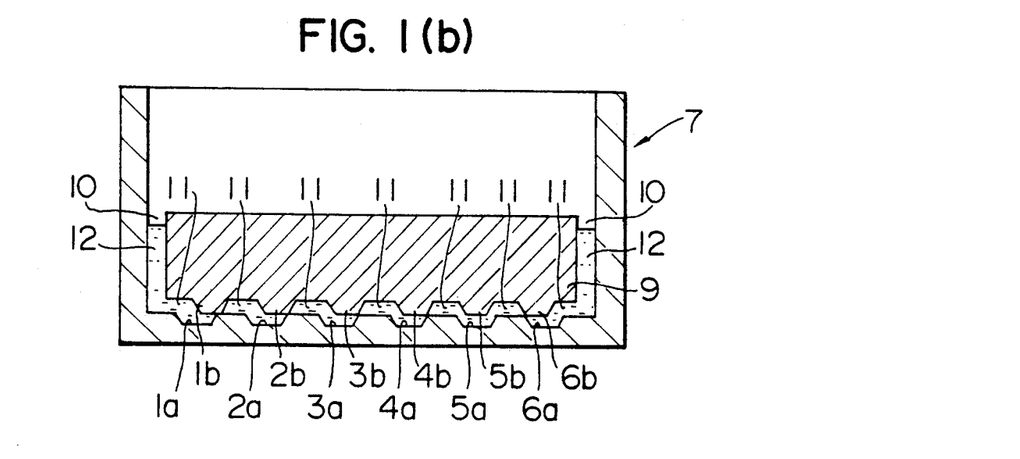
Figure 1C:
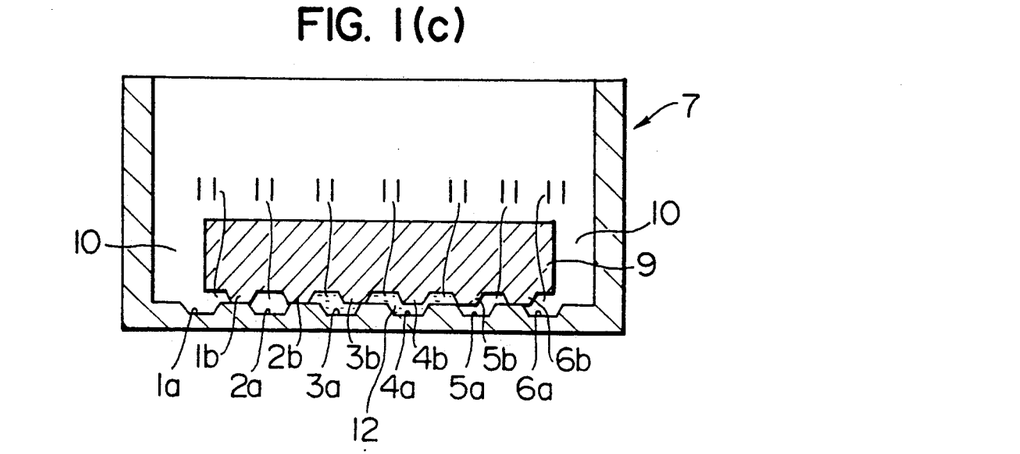
Figure 1D:
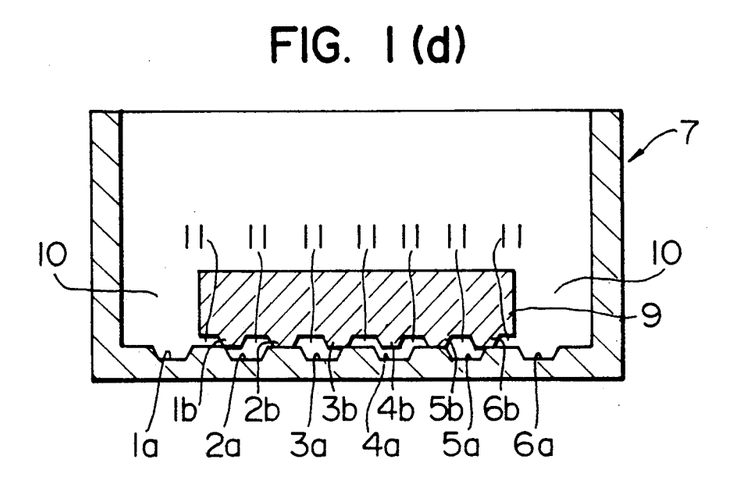
Figure 1E:
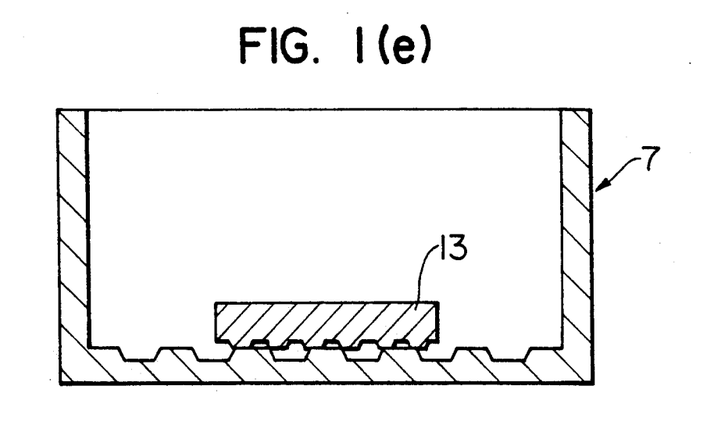

That is, as illustrated in FIG. 1(a), in the first step, the sol solution 8 is poured into a molding container 7 having a rectangular bottom wall whose inner surface is formed with a plurality of recesses 1a through 6a. Then, the sol solution 8 is subjected to hydrolysis, dehydration and condensation to form a wet gel 9. In the second step, the wet gel 9 is shrunk by drying while maintaining a cross-sectional configuration which is substantially analogous to that at the wet gel 9. At this time, a space 10 is formed between an inner surface of a peripheral wall of the molding container 7 and the wet gel 9 on the way of drying and shrinking. Further, a plurality of portions 1b through 6b of the wet gel 9, which have been located respectively at respective bottom surfaces of the recesses 1a through 6a at the sol solution 8 in FIG. 1(a) are formed by rising up to the upper surface of the bottom wall of the molding container 7, after drying and shrinking. Thus, as shown in FIG. 1(b), a plurality of gaps 11 are formed between the bottom wall of the molding container 7 and the wet gel 9 on the way of drying and shrinking, and a liquid produced by drying and shrinking of the wet gel 9 is collected in the gaps 11 and the space 10 to form a liquid layer 12. Subsequently, as illustrated in FIG. 1(c) and 1(d), the wet gel 9 on the way of drying and shrinking is further dried and shrunk. At this time, the liquid layer 12 is vaporized and removed through the gaps 11 and the space 10. Thus, as illustrated in FIG. 1(e), a dry gel 13 is produced.

Accordingly, in the case where the first step of obtaining the wet gel from the sol solution and the second step of obtaining the dry gel from the wet gel are conducted within the same molding container, each of the recesses formed in the inner surface of the bottom wall should have a cross-sectional configuration which permits the lower ends of the respective parts of the wet gel, which have been located respectively on the bottom surface of the respective recesses, to rise up to the inner surface of the bottom wall of the molding container on the way of drying and shrinking.

Figure 2:
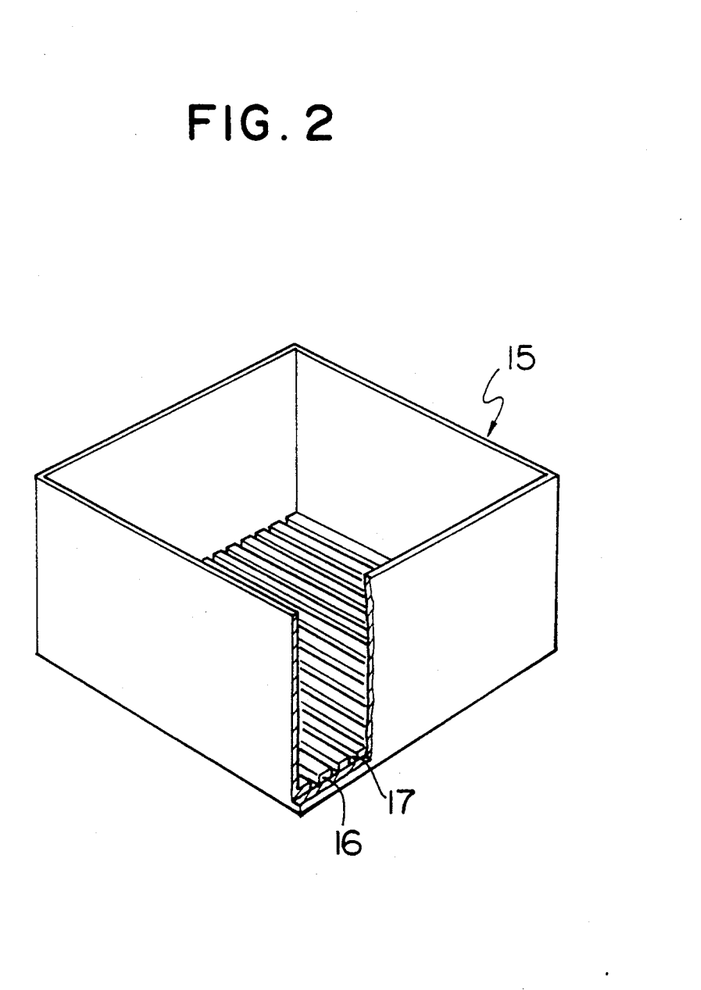
FIG. 2 is a partially broken-away, perspective view of a molding container according to an embodiment of the invention.
Figure 3A:
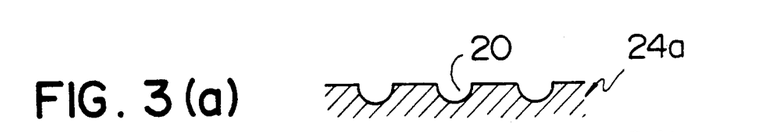
FIGS. 3(a) through 3(d) are fragmentary cross-sectional views showing cross-sectional configurations of respective grooves which are provided in an inner surface of a bottom wall of each of molding containers according respectively to other various embodiments of the invention.
Figure 3B:
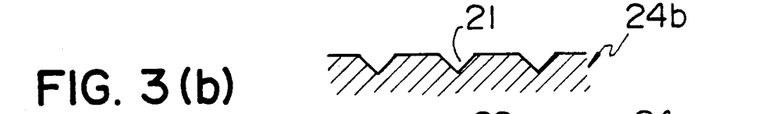
Figure 3C:
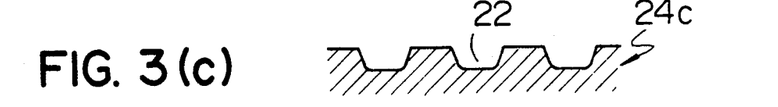
Figure 3D:
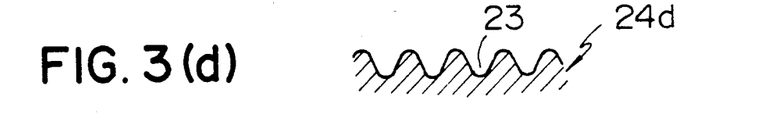
Figure 4A:
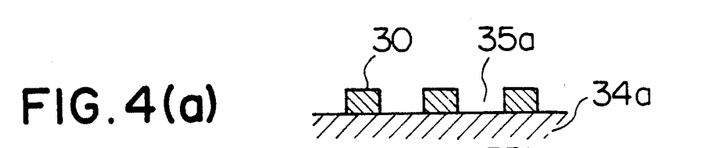
FIGS. 4(a) through 4(d) are fragmentary cross-sectional views showing cross-sectional configurations of respective straight projections which are provided on an inner surface of a bottom wall of each of molding containers according respectively to still other various embodiments of the invention.
Figure 4B:
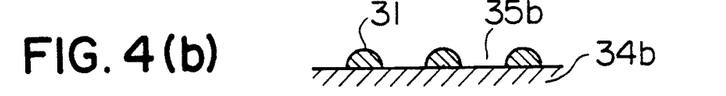
Figure 4C:
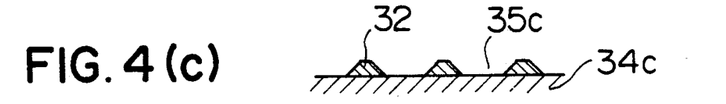
Figure 4D:
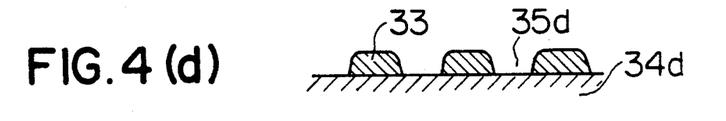

An example of the molding container having the bottom wall whose inner surface is formed with the recesses is illustrated in FIG. 2. In FIG. 2, a plurality of recesses in a molding container 15 are formed respectively by a plurality of grooves 17 which are provided straight in an upper surface of a rectangular bottom wall 16 of the molding container 15. The grooves 16 have their respective rectangular cross-sectional configurations, and extend in parallel relation to each other. As shown in FIGS. 3(a) through 3(d), in place of the recesses 17 having their respective rectangular cross-sectional configurations, a plurality of grooves 20 each having a semi-circular cross-sectional configuration, a plurality of grooves 21 each having a V-shaped cross-sectional configuration, a plurality of grooves 22 each having a cross-sectional configuration in the form of a bottom of a pot, a plurality of grooves 23 each having a cross-sectional configuration which is in the form of a sinusoidal wave, and so on may be formed respectively in the upper surfaces of the bottom walls of the respective molding containers in parallel relation to each other, thereby forming recesses in upper surfaces 24a through 24d of the bottom wall of the molding container. In this connection, as shown in FIG. 3(c), each of the grooves may have a cross-sectional configuration in which the groove has its planar bottom surface and a pair of side wall surfaces diverging toward the inner surface of the bottom wall. In this case, the lower ends of the respective portions of the wet gel, which are located respectively at the bottom surfaces of the respective recesses, easily rise up to the inner surface of the bottom wall of the molding container on the way of drying and shrinking. Thus, provision of such recesses having such cross-sectional configurations is particularly preferable.

The grooves may be formed respectively between a plurality of straight projections formed on the inner surface of the bottom wall of the molding container to form the recesses in the inner surface of the bottom wall. That is, as shown in FIGS. 4(a) through 4(d), a plurality of projections 30 each having a rectangular cross-sectional configuration, a plurality of projections 31 each having a semi-circular cross-sectional configuration, a plurality of projections 32 each having a trapezoidal cross-section, a plurality of projections 33 each having a cross-sectional configuration which is in the form of a bottom of a pot, and so on are provided straight respectively on upper surfaces of bottom walls 34a through 34d of the respective molding containers, thereby forming recesses 35a through 35d. In this connection, each of the grooves has a cross-sectional configuration in which the groove has its planar bottom surface and a pair of side wall surfaces diverging toward the upper surfaces of respective corresponding two of the projections. In this case, the lower ends of the respective portions of the wet gel are located respectively at the bottom surfaces of the respective recesses, easily rise up to the upper surfaces of the respective projections on the inner surface of the bottom wall of the molding container on the way of drying and shrinking. Thus, provision of such projections having such cross-sectional configurations is particularly preferable.

Figure 5:
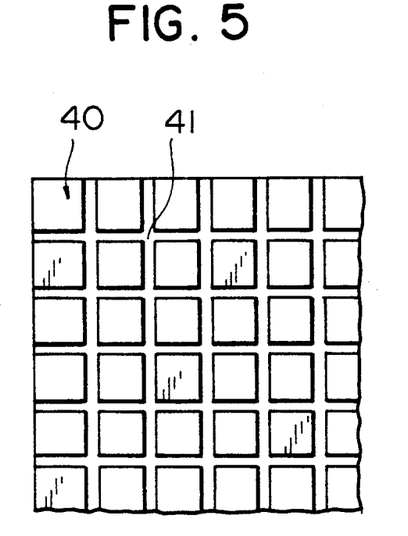
FIG. 5 is a top plan view of a molding container according to another embodiment of the invention, wherein the molding container has a bottom wall whose inner surface is provided with a plurality of grooves which extend perpendicularly to each other or in an intersected relation to each other.

In addition to formation of the recesses by provision of the plurality of straight grooves or projections extending in parallel relation to each other as describe above, as shown in FIG. 5, the recesses may include a plurality of grooves 41 which are provided in an upper surface of a bottom wall 40 of a molding container. The grooves 41 extend straight in parallel relation to each other in an intersected manner. That is, the grooves 41 are intersected with each other at right angles. Alternatively, a plurality of projections may be arranged in the form of checkers or squares.

In connection with the above, in formation of the grooves or projections in or on the upper surface of the bottom wall of the molding container, it is unnecessary to provide the grooves or projections in parallel relation to the peripheral wall of the molding container, or in perpendicular relation to the peripheral wall, but the grooves or projections may be formed in oblique relation to the peripheral wall of the molding container. Further, the grooves or projections may not be straight in plan, but may be curved in plan. Moreover, the recesses formed may have their respective upper ends which are not uniform in width.

Figure 6:
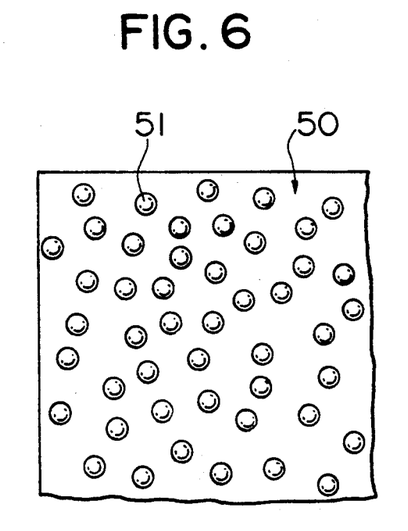
FIG. 6 is a top plan view of a molding container according to still another embodiment of the invention, wherein the molding container has a bottom wall whose inner surface is formed with a plurality of semi-spherical projecting points in a random manner.

In order to provide a plurality of projections on the inner surface of the bottom wall of the molding container to form a continiuos recess, as shown in, for example, FIG. 6, a plurality of semi-spherical projecting points 51 can be provided on an inner surface of a bottom wall 50 of a molding container to form a continuous recess at the inner surface of the bottom wall. Further, in substitution for the semi-spherical projecting points 51, a plurality of projecting points each of which has a cross-sectional configuration which is rectangular, trapezoidal, or in the form of a bottom of a pot, or the like, may be provided on the inner surface of the bottom wall of the molding container. The plurality of projecting points may be arranged in a small-projection manner. Likewise, a plurality of concave points may be provided in the inner surface of the bottom wall of the molding container to form a plurality of recesses.

Figure 7:
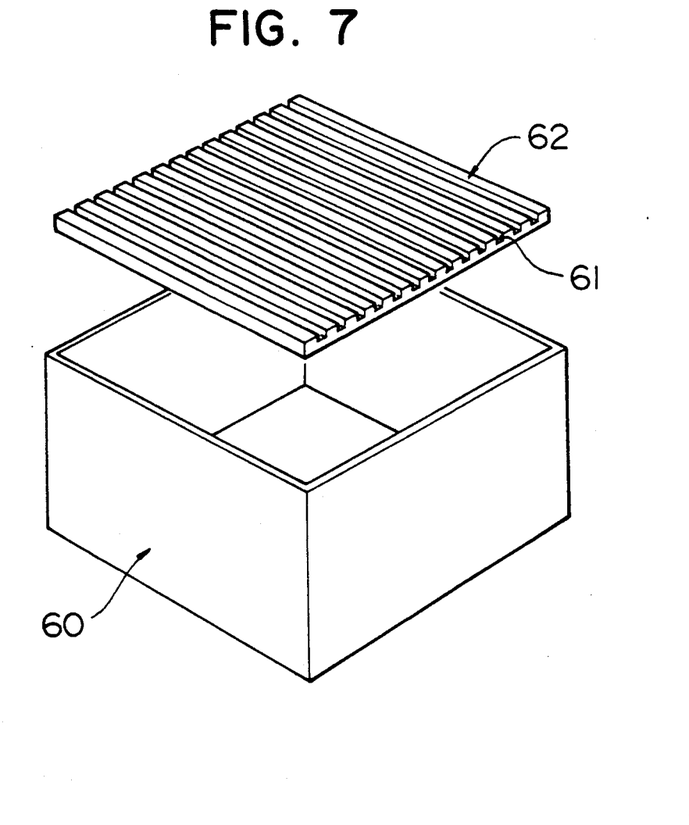
FIG. 7 is a perspective view of a molding container according to still another embodiment of the invention, wherein a plate having an upper surface provided with a plurality of grooves rests on a planar inner surface of a bottom wall of the molding container.

Furthermore, as shown in FIG. 7, a plate 62 having its upper surface formed with a plurality of recesses 61 each of which has a rectangular cross-sectional configuration and which extend in parallel relation to each other, may rest on a planar inner surface of an rectangular bottom wall of a molding container 60. Further, in substitution for the plate 62 formed with the grooves 61 extending in parallel relation to each other, a plate or a sheet having a recess or recesses may be used similarly to the case where the aforesaid projections, grooves, projecting points or concave points are provided in or on the inner surface of the bottom wall of the molding container to form the recess or recesses. In this connection, in causing such plate or sheet to rest on the inner surface of the bottom wall of the molding container to form the recess or recesses, it is preferable that contact areas between the plate or the sheet and the inner surface of the peripheral wall and the inner surface of the bottom wall of the molding container are shielded so as not to permit the sol solution to enter or invade the contact areas.

Figure 8:
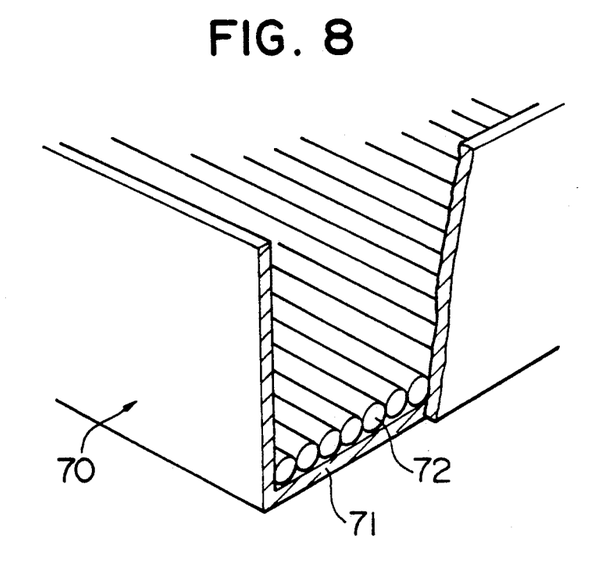
FIG. 8 is a partially broken-away, fragmentary perspective view of a molding container according to other embodiment of the invention, wherein a plurality of rod-like elements are spread over an inner surface of a bottom wall of the molding container to form a plurality of grooves.

In addition thereto, as illustrated in FIG. 8, a plurality of elongated elements 72 may be spread over an inner surface of a rectangular bottom wall 71 of a molding container 70 to form a plurality of straight recesses respectively between the rod-like elements 72. Each of the elongated element 72 has a circular cross-sectional configuration. Alternatively, in substitution for the elongated elements 72 each having the circular cross-sectional configuration, a plurality of elongated elements or tube-like elements may be used whose cross-sectional configurations are semi-circular, trapezoidal, triangular, in the form of a bottom of a pot, or the like. In this connection, in case where such elongated or tube-like elements are spread over the inner surface of the bottom wall of the molding container to form the recesses, it is preferable that contact areas between the elongated or pipe-like elements and the inner surface of the peripheral wall and the inner surface of the bottom wall of the molding container, and between each adjacent elongated or tube-like elements are sealed so as not to permit the sol solution to enter or invade the contact areas.

In case where the first step of obtaining the wet gel from the sol solution and the second step of obtaining the dry gel from the wet gel are conducted within the same molding container, it is preferable that the recess or each of the recesses has a depth of the order of 0.01 mm to 3 mm. If the depth of the recess or each of the recesses is less than 0.01 mm, it becomes difficult to form the gap or gaps communicating with the space generated between the inner surface of the peripheral wall of the molding container and the gel on the way of drying and shrinking, and between the inner surface of the bottom wall of the molding container and the gel on the way of drying and contraction. Further, if the depth of the recess or each of the recesses is larger than 3 mm, the lower ends of the respective portions of the wet gel located respectively at the bottom surfaces of the recesses is impeded from rising up to the upper surface of the bottom wall of the molding container, accompanied with drying and shrinking of the wet gel, so that the gel tends to be broken at the portions. This is also not preferable from the viewpoint of practical use.

Furthermore, a plurality of projections having their respective planar tops may be provided on the inner surface of the bottom wall of the molding container to form a continuous recess. In this case, it is preferable that the planar top of each of the projections has a maximum diameter equal to or less than approximately 20 mm. If the planar top of each of the projections has its diameter larger than 20 mm, it becomes difficult to vaporize and remove a liquid layer which occurs between the planar tops of the respective projections and the gel on the way of drying and shrinking. This is not preferable in view of practical use.

(2) The case will next be described where the first step of obtaining the wet gel from the sol solution is conducted by a separate container, and the second step of obtaining the dry gel from the wet gel are conducted by the use of a molding container having a bottom wall whose inner surface is formed with a recess or recesses.

In this case, the container used in the first step may be a molding container having a bottom wall whose inner surface is planar, or a molding container having a bottom wall whose inner surface is formed with a recess or recesses, or may be any containers having other configurations.

The molding container having the bottom wall whose inner surface is formed with the recess or recesses, which is used in the second step, should have the bottom wall whose inner surface is provided with a plurality of planar surface sections or a plurality of support points on which the wet gel rests. Further, a gap or gaps communicating with the space occurring between the inner surface of the peripheral wall of the molding container and the gel on the way of drying and shrinking, accompanied with drying and shrinking of the wet gel, should be secured between the inner surface of the bottom wall of the molding container and the gel on the way of drying and shrinking. Thus, the cross-sectional configuration of the recess or each of the recesses is not particularly limited to a specific one.

Further, in the case where the plate or sheet having the upper surface formed with the recess or recesses rests on the planar inner surface of the bottom wall of the molding container to form the recess or recesses, or even in the case where the rod-like or tube-like elements are spread over the inner surface of the bottom wall of the molding container to form the recess or recesses, the interface between the plate, sheet or rod-like or tube-like elements and the inner surface of the peripheral wall and the inner surface of the bottom wall of the molding container, and the interface between each pair of adjacent rod-like elements or the interface between each pair of adjacent pipe-like elements may not be shielded. Further, in the case where the rod-like or tube-like elements are used to form the recesses on the inner surface of the bottom wall of the molding container, it is not required that the rod-like or tube-like elements are spread over the inner surface of the bottom wall of the molding container, but the rod-like or tube-like elements may be arranged with a spacing defined between each pair of adjacent rod-like or tube-like elements. Moreover, the rod-like or tube-like elements may be arranged on the inner surface of the bottom wall of the molding container in a rotatable manner accompanied with drying and shrinking of the wet gel.

In connection with the above, in formation of the plurality of recesses in the inner surface of the bottom wall of the molding container, it is preferable that the upper ends of the respective recesses are located respectively on the same plane, and the lower ends of the respective recesses are located respectively on the same plane, in both cases where the first step of obtaining the wet gel from the sol solution and the second step of obtaining the dry gel from the wet gel are conducted within the same molding container having the bottom wall whose inner surface is formed with the recesses and where the first step is conducted within a separate container and the second step is conducted within the molding container having the bottom wall whose inner surface is provided with the recesses. In the case where the plurality of projecting points are arranged on the inner surface of the bottom wall of the molding container in a small-projection manner to form the continuous recess, the upper and lower ends of the recess may not be located respectively on the same planes.

Further, since the gel on the way of drying and shrinking is held on the inner surface of the bottom wall of the molding container by the portions of the wet gel which are located respectively at the bottom surfaces of the respective recesses, it is required to arrange the recesses in consideration of the fact that the gel on the way of drying and shrinking is not broken due to its own weight or gravitational weight. The arrangement of the recesses is suitably set in accordance with the configuration and weight of the dry gel accompanied with configuration of a desired glass article. In either case, drying and shrinking of the wet gel enable the gaps communicating with the space occurring between the inner surface of the peripheral wall of the molding container and the gel on the way of drying and contraction, to be formed between the inner surface of the bottom wall of the molding container and the gel on the way of drying and shrinking. Further, the arrangement should be such that the liquid layer occurring between the inner surface of the bottom wall of the molding container and the gel on the way of drying and shrinking, accompanied with drying and shrinking of the wet gel, is sufficiently vaporized and removed through the above-described gaps, and the bottom layer of the gel on the way of drying and shrinking is sufficiently dried.

As mentioned above, in the second step, the molding container having the bottom wall whose inner surface is formed with the recesses is used to obtain the dry gel from the wet gel. By using the molding container described above, the wet gel is heat-treated at temperature from the room temperature to 70° C. for five (5) through ninety (90) days, thereby drying and shrinking the wet gel to obtain the dry gel.

In the invention, the third step is one in which the dry gel obtained by the second step is heated and sintered into a non-porous glass to obtain the desired glass article. The heating and sintering can be effected by heat-treating the obtained dry gel at 900° C. ~1400° C.

Various examples of the invention will be described below.

EXAMPLE 1

There were used 4 liters of tetraethoxysilane as a metal alkoxide, 4.8 liters of ethanol as an organic solvent, and 1.2 liters of $9 \times 10^{-4}$ mol/l aqueous ammonia as a hydrolysis catalyst. These were mixed with each other to obtain 10 liters of a mixed solution. Subsequently, the mixed solution was held for eight (8) days at 65° C. and was concentrated to a volume of 6.5 liters. 0.2 liters of 5% aqueous solution of hydrosilicofluoric acid was added to and mixed with 2.5 liters of the thus obtained concentrated solution, to obtain a sol solution. The sol solution was poured into a molding container which had its dimension of $350 \times 350 \times 120$ mm. The molding container had a bottom wall whose inner surface is provided with twenty (20) straight grooves to form a plurality of recesses which are equidistantly spaced from each other. Each of the grooves had a depth of 0.3 mm and a width of 7 mm, and a cross-sectional configuration which was in the form of a bottom of a pot. The sol solution was gelled under a closed condition to obtain a wet gel.

Subsequently, a plurality of bores were formed in a lid or closure member of the molding container such that an opening ratio was brought to 0.8%. The wet gel was heat-treated at 45° C. for thirty (30) days and was dried and shrunk to obtain a dry gel without occurrence of cracks.

Subsequently, the thus obtained dry gel was raised in temperature from the room temperature to 1200° C. for fifty (50) hours, was held for two (2) hours at the same temperature, and was sintered, to obtain a transparent rectangular glass article in the form of a planar plate having a dimension of 150×150×11 mm, without occurrence of cracks.

EXAMPLES 2 and 3

As the molding container for use in drying and shrinking the wet gel to obtain the dry gel, there were utilized a molding container (Example 2) having a bottom wall whose inner surface was provided with twenty (20) straight projections equidistantly spaced from each other and having a height of 0.2 mm and a width of 7 mm, to form a plurality of recesses, and a molding container (Example 3) having a bottom wall whose inner surface was provided with one-hundred (100) projecting points arranged in a small-projection manner and having a height of 0.2 mm and a maximum diameter of 7 mm, to form a continuous recess. Except for the above, the wet gel of each of the Examples 2 and 3 was treated similarly to the Example 1 to obtain a dry gel without occurrence of cracks.

Subsequently, the thus obtained dry gel was heated and sintered similarly to the Example 1 to obtain a transparent rectangular glass article in the form of a planar plate similar to that of the Example 1 without occurrence of cracks.

COMPARATIVE EXAMPLE 1

A sol solution was used which was obtained similarly to the Example 1. The sol solution was poured into a molding container having a bottom wall whose inner surface was planar and having a dimension or size of 350×350×120 mm. The sol solution was dried and shrunk under a closed condition to obtain a wet gel. Subsequently, a plurality of bores were formed in a lid or closure member of the molding container such that an opening ratio was brought to 0.8%. The wet gel was continuously heat-treated at 45° C. and was dried and shrunk. Since, however, a liquid layer occurring between the gel on the way of drying and shrinking and the inner surface of the bottom wall of the molding container was not sufficiently vaporized and removed, cross cracks occurred on the fifteenth (15) day.

COMPARATIVE EXAMPLE 2

A plurality of bores were formed in a lid or closure member of a molding container such that an opening ratio was brought to 0.01%. Except for the above, a wet gel was dried and shrunk similarly to the Comparative Example 1. A liquid layer was vaporized and removed which occurred between a gel on the way of drying and shrinking and an inner surface of a bottom wall of the molding container. However, cross cracks occurred on the ninety-fifth (95) day before a dry gel was formed.

EXAMPLE 4

A sol solution obtained similarly to the Example 1 was poured into a molding container having a bottom wall whose inner surface was planar and having a dimension of 350×350×120 mm. The sol solution was dehydrated and condensed to obtain a wet gel.

Subsequently, the wet gel was removed from the molding container having the bottom whose upper surface was planar. The wet gel was transferred into the molding container in which glass tubes each having a diameter of 5 mm were arranged on the inner surface of the bottom wall of the molding container at intervals of 3 mm. The wet gel was dried and shrunk similarly to the Example 1 to obtain a dry gel without occurrence of cracks.

Subsequently, the dry gel was heated and sintered similarly to the Example 1 to obtain a transparent rectangular glass article in the form of a planar plate which was similar to that of the Example 1, without occurrence of cracks.

EXAMPLES 5 THROUGH 7

There were used 1 liter of tetramethoxysilane as a metal alkoxide, 0.2 liter of ethanol as an organic solvent, and 1 ml of 0.1N hydrochloric acid as a hydrolysis catalyst. 2 liters of water were added to these components. These were stirred for thirty (30) minutes under ice cooling, to obtain a transparent sol solution.

The sol solution was used to manufacture a glass article in a manner similar to the Examples 1 through 3. In either case, a transparent rectangular glass article in the form of a planar plate was obtained without occurrence of cracks.

COMPARATIVE EXAMPLES 3 THROUGH 8

As comparative examples of the Examples 5 through 7, dry gels were manufactured under similar conditions in accordance with the Comparative Examples 1 and 2. In either case, results were obtained similarly to the Comparative Examples 1 and 2.

What is claimed is:

1. A molding container for receiving a wet gel produced in a sol-gel process during drying and contracting, said molding container having a bottom wall and a peripheral wall, said bottom wall having an inner surface thereof formed with a continuous recess;

wherein said continuous recess is formed by a plurality of projections on said inner surface of said bottom wall;

wherein said projections have planar tops each of which has a surface area of approximately 20 mm;

wherein said wet gel in said continuous recess, during drying and shrinking, rises up to said planar tops of said projections on said inner surface of said bottom wall from a bottom of said continuous recess;

wherein said wet gel is dried and contracted to form a gap between said inner surface of the bottom wall of said molding container and the gel during drying and shrinking, said gap communicates with a space which is defined between an inner surface of said peripheral wall and the gel during drying and shrinking; and wherein a liquid layer, which is generated by the drying and shrinking of said wet gel, between said inner surface of the bottom wall and the gel during drying and shrinking of said wet gel, and which is received in said continuous recess, is vaporized and removed to the ambient atmosphere through said gap and said space, whereby a bottom layer of the gel during drying and shrinking is dried.

2. The molding container according to claim 1, wherein said bottom wall includes a detachable plate mounted on said inner surface of said bottom wall, said detachable plate having an upper surface which is formed with said recesses.

3. The molding container according to claim 2, wherein each of said recesses has a rectangular cross-sectional configuration, said recesses extending in parallel relation to each other.

4. A molding container for receiving a wet gel produced in a sol-gel process during drying and shrinking, said molding container having a bottom wall and a peripheral wall, said bottom wall having an inner surface thereof formed with a plurality of recesses;
wherein said wet gel received in said recesses, during drying and shrinking, rises up to said inner surface of said bottom wall from bottoms of said recesses;
wherein said wet gel is dried and contracted to form a first gap between said inner surface of the bottom wall of said molding container and the gel during drying and shrinking, said first gap communicates with a space which is defined between an inner surface of said peripheral wall and the gel during the drying and shrinking;
wherein a liquid layer, which is generated by the drying and shrinking of said wet gel, between said inner surface of the bottom wall and the gel during drying and shrinking of said wet gel, and which is received in said recesses, is vaporized and removed to an ambient atmosphere through said first gap and said space, whereby a bottom layer of the gel during drying and shrinking is dried;
wherein said molding container includes a plurality of elongated elements which are spread over said inner surface of said bottom wall to form said recesses respectively between said elongated elements; and
wherein said elongated elements are in contact with each other, a contact area between each pair of adjacent elongated elements being sealed to inhibit invasion of a liquid layer into a second gap defined between said elongated elements and the inner surface of said bottom wall.

* * * * *